Dec. 31, 1940. R. STERN 2,226,592
PREVENTION OF SCALE DEPOSITS IN STEAM GENERATING PLANTS
Filed March 19, 1938
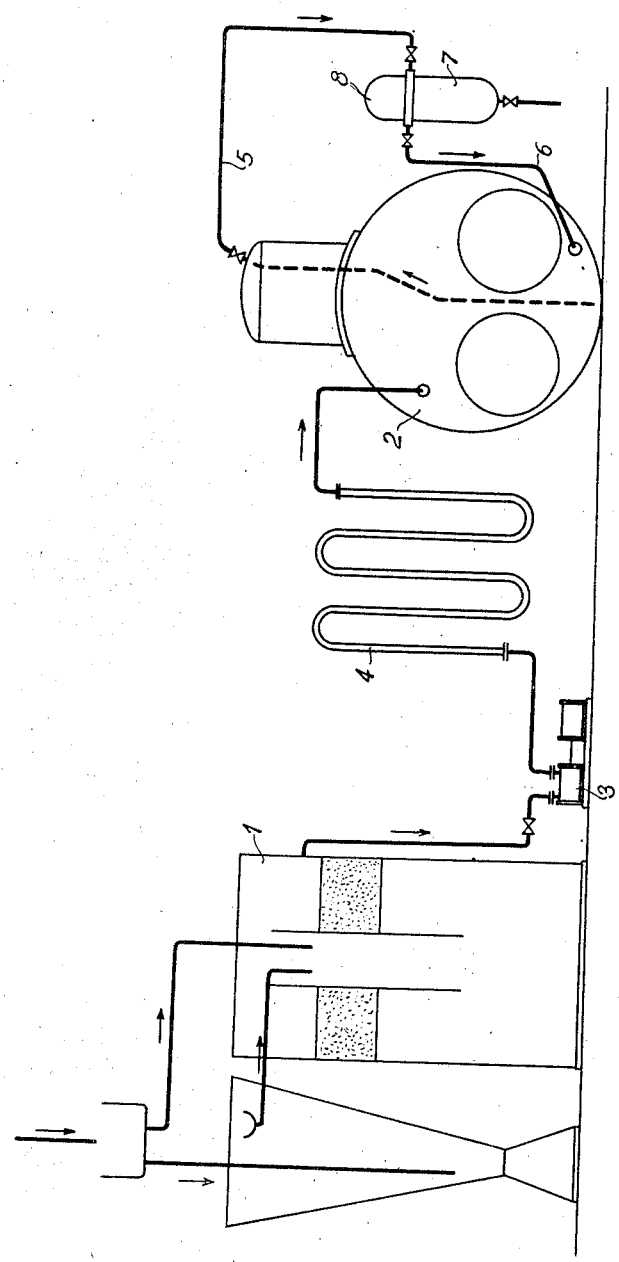
Inventor
Roland Stern
By Blinger, Atty.

Patented Dec. 31, 1940

2,226,592

UNITED STATES PATENT OFFICE 2,226,592

PREVENTION OF SCALE DEPOSITS IN STEAM GENERATING PLANTS

Roland Stern, Vienna, Austria

Application March 19, 1938, Serial No. 197,007
In Austria March 27, 1937

2 Claims. (Cl. 122—379)

This invention relates to the prevention of scale in steam generating plants. Installations for the preparatory treatment of boiler feed water are known in which the chemicals used to precipitate out the hardening principles are all added to the initial supply of water before this water enters the boiler, with the result that the precipitating out of these hardening principles takes place for the greater part in the so-called pre-purifying tank.

These pre-purifying plants have the advantage that water freed for the greater part from hardening ingredients enters the preheater, with the result that the scale deposit in the preheater is diminished. These pre-purifying plants have the disadvantage, however, that to effect precipitation of the constituents responsible for permanent hardness it is necessary to work with an excess of alkali, since otherwise the reactions would not proceed rapidly enough or thoroughly enough at normal pressure and at ordinary room temperature. It is thus inevitable with these pre-purifying plants that with every litre of purified water there passes into the boiler some of the surplus alkali which is there consumed only to a minor extent in neutralizing the residual hardness of the water as it enters the boiler, while the remainder thereof stays in the boiler unutilized. Since this alkali surplus becomes constantly enriched by the evaporation of the water in the boiler the known pre-purifying plants work with what is known as de-salting. This involves leaving the boiler permanently open to a certain extent, which is inevitably attended by considerable loss of heat, chemicals, and pressure, even if the water removed for de-salting purposes is partly utilized.

The desire to avoid these losses led to the designing of circulation water purifiers in which the chemical agents are not added to the boiler feed water until this water is under pressure. An input controlling device is used in conjunction with the circulation feed water purifier for regulating the rate at which the chemical agents are added. In this manner the result is achieved that the whole of the alkali added to the feed water is actually consumed, since even if the rate of introduction of the chemical agents the alkalinity of the feed water can be adjusted again to the required level by closing the admission valve for the chemicals and feeding in fresh water. This possibility does not of course exist for the pre-purifying plants, since the feeding in of fresh water to correct the increasing excess of alkali would immediately lead to silting up of the boiler in the case of pre-purifying plants. In the circulating method the sediment formed in the same process is continuously filtered off from the water, under pressure.

All the circulating methods, without exception, however, have the drawback that the fresh water passes into the preheater without partial or complete softening, with the result that the preheater necessarily becomes much more rapidly furred in the case of the circulating method than in the case of the pre-purifying method.

Now it is the object of the present invention by the simultaneous use of both these methods to retain and combine the advantages of both while at the same time avoiding the drawbacks attendant on the use of either by itself.

The invention proceeds from the known fact that in the preheater practically only the principles responsible for the temporary hardness of the water are deposited, since the breaking up of the bicarbonates sets in rapidly at temperatures in excess of 60° C., and this effect of the high temperatures prevailing in the preheater is still further intensified by the pressure on this part of the plant. As is known, the principles responsible for the permanent hardness of the water are mainly deposited only during the evaporation of the water, on the heating surfaces, so that the pre-heater remains free from deposits comprising substances from this group.

The method according to the present invention therefore divides the softening process into two absolutely separate phases, and that in such a manner that the precipitating out of the principles responsible for the temporary hardness, which mainly form the deposits in the preheater, is for the greater part effected before the feed water enters this section of the plant, in accordance with the pre-purifying method, while the removal of the principles responsible for the permanent hardness is effected in the boiler, by the circulating method, without the above described losses being incurred.

The main representatives of the principles responsible for temporary hardness are calcium bicarbonate and magnesium bicarbonate, while those of the principles responsible for permanent hardness are calcium sulphate and magnesium sulphate. It will be understood though that all other hardeners come under the one or the other of these headings. The principles responsible for temporary hardness are removed in accordance with the invention, by the pre-purifying method, as a rule by the addition of lime water, that is to say with the aid of an aqueous solution of calcium hydroxide, while as precipitant for the principles responsible for permanent hardness in the boiler there is employed primarily soda which is added to the boiler water in a purifier through which this water circulates.

In the accompanying drawing there is shown diagrammatically an installation suitable for the carrying out of the method according to the invention. The feed water, after having been freed from the greater part of its temporary hardness in the pre-purifying plant 1 by the action of known chemical precipitants, is fed to the boiler 2 through the preheater 4 by means of the pump 3. The separating out of the principles responsible for permanent hardness and of the residual temporary hardness from the boiler water is then effected by means of a known circulation water-purifier 7 which communicates with the boiler 2 through the flow and return pipes 5, 6, and in which the chemicals (contained in the upper part 8 of the purifier 7) necessary to effect precipitation of these hardening principles are at the same time added to the boiler water as it circulates therethrough.

I claim:

1. The method of preventing scale deposit in steam generating plants which have a pre-heating stage, said method consisting in first treating, to an extent only sufficient to keep the pre-heater clean, the water from the source of supply with chemicals such as lime for example to precipitate those principles which are responsible for temporary hardness of the water and removing the precipitate by filtration, then forcing the same treated water to the boiler via the pre-heater; then precipitating the remaining principles responsible for temporary hardness of the water and also the principles responsible for permanent hardness of the water for the purpose of removing said principles from the water in the boiler under boiler pressure and temperature, by circulating the water through a separate circulatory system having a purifier containing suitable chemicals, as for example soda, trisodium-phosphate, in which the principles are precipitated before the water is returned to the boiler.

2. The method of preventing scale deposit in steam generating plants which have a pre-heating stage, said method consisting in first treating, to an extent only sufficient to keep the pre-heater clean, the water from the source of supply with chemicals such as lime for example to precipitate those principles which are responsible for temporary hardness of the water and removing the precipitate by filtration, then forcing the same treated water to the boiler via the pre-heater; then precipitating the remaining principles responsible for temporary hardness of the water and also the principles responsible for permanent hardness of the water for the purpose of removing said principles from the water in the boiler under boiler pressure and temperature, by circulating the water through a separate circulatory system having a purifier containing suitable chemicals, as for example soda, trisodium-phosphate, in which the principles are precipitated before the water is returned to the boiler, the water being caused to flow through said circulatory system by thermo-syphonic action.

ROLAND STERN.